United States Patent
Laird et al.

(10) Patent No.: US 7,607,139 B2
(45) Date of Patent: Oct. 20, 2009

(54) QUIESCENCE MODE FOR A PORTAL

(75) Inventors: Peter Laird, Superior, CO (US); Josh Lannin, Boulder, CO (US)

(73) Assignee: BEA Systems, Inc., Redwood Shores, CA (US)

( * ) Notice: Subject to any disclaimer, the term of this patent is extended or adjusted under 35 U.S.C. 154(b) by 950 days.

(21) Appl. No.: 11/108,384

(22) Filed: Apr. 18, 2005

(65) Prior Publication Data

US 2006/0031851 A1    Feb. 9, 2006

Related U.S. Application Data

(60) Provisional application No. 60/573,308, filed on May 21, 2004.

(51) Int. Cl.
  *G06F 3/00* (2006.01)
  *G06F 9/44* (2006.01)
  *G06F 9/46* (2006.01)
  *G06F 13/00* (2006.01)
  *G06F 7/04* (2006.01)
  *G06F 17/30* (2006.01)
  *G06F 15/173* (2006.01)
  *H04L 9/32* (2006.01)

(52) U.S. Cl. .......................... 719/320; 718/102; 726/2; 709/223

(58) Field of Classification Search ................. 719/320; 717/120–121, 127, 168; 726/2; 718/102; 709/223–226
See application file for complete search history.

(56) References Cited

U.S. PATENT DOCUMENTS

| | | | |
|---|---|---|---|
| 7,451,448 B1 * | 11/2008 | Rhee et al. | 718/104 |
| 2002/0103660 A1 * | 8/2002 | Cramon et al. | 705/1 |
| 2005/0010634 A1 * | 1/2005 | Henderson et al. | 709/201 |

\* cited by examiner

*Primary Examiner*—Nathan E Price
*Assistant Examiner*—Qing-Yuan Wu
(74) *Attorney, Agent, or Firm*—Fliesler Meyer LLP

(57) ABSTRACT

A quiescence mode for a portal allows a portal configuration to be protected from changes. This allows the configuration to be maintained during long running operations without a risk that the portal configuration will be changed during the operation.

17 Claims, 3 Drawing Sheets

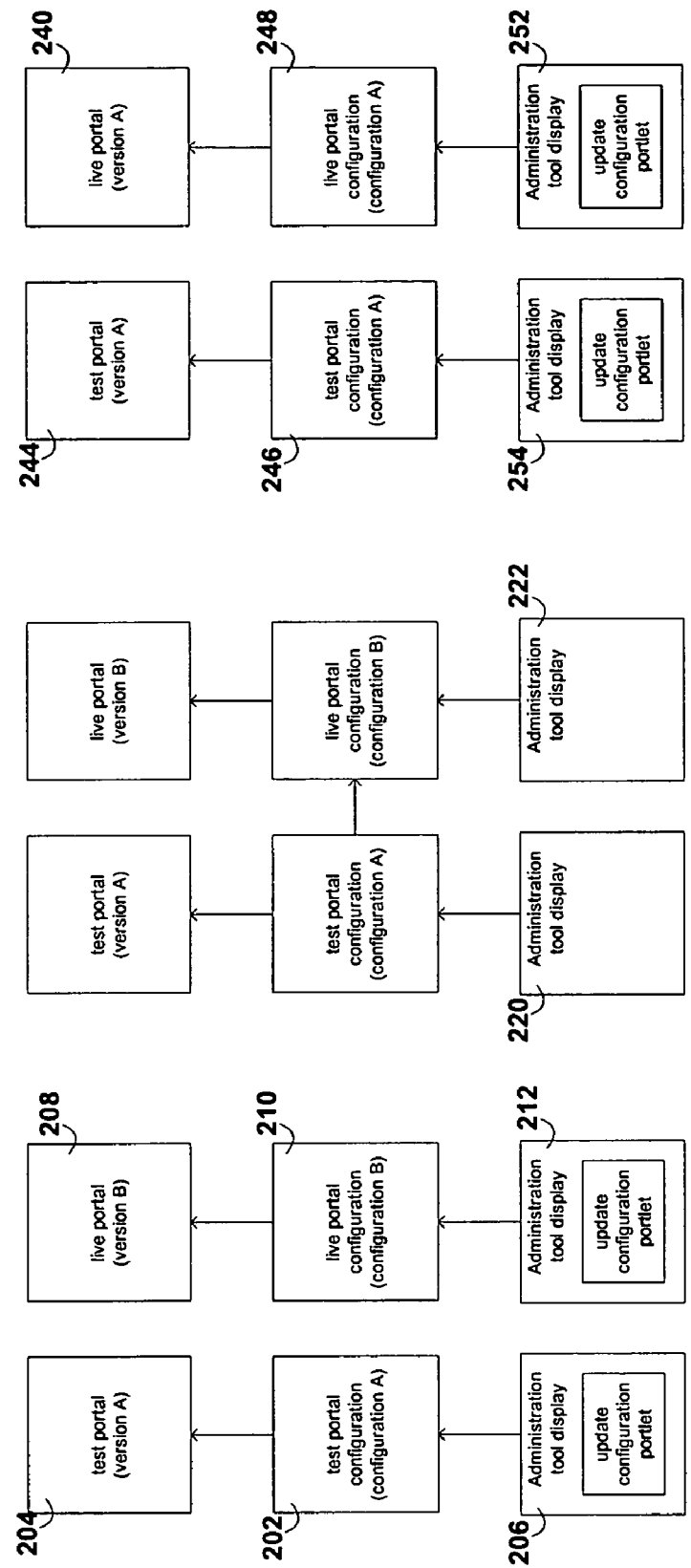

QUIESCENCE MODE FOR A PORTAL

CLAIMS OF PRIORITY

This application claims priority to U.S. Provisional Application No. 60/573,308 entitled "Quiescence Mode" by Laird et al., filed May 21, 2004.

FIELD OF THE INVENTION

The present invention relates to ways of operating portals.

BACKGROUND

Portals can provide access to information networks and/or sets of services through the World Wide Web and other computer networks. Portals can provide a single point of access to data and applications, making them valuable to developers, businesses, and consumers alike. A portal can present a unified and personalized view of enterprise information to employees, customers, and business partners. In many implementations, portal applications can include web application views designed as a portal.

Portals are capable of presenting multiple web application views within a single web interface. In addition to regular web content that can appear in a portal, portals provide the ability to display portlets (self-contained applications or content) in a single web interface. Portals can also support multiple pages with menu-based or custom navigation for accessing the individualized content and portlets for each page.

A working portal can be defined by a portal configuration. The portal configuration can include a portal definition such as a file including Extensible Markup Language (XML); portlet definition files for any portlets associated with the portal; java server pages (JSPs); web application descriptors; images such as graphics interchange format files (GIFs); deployment descriptors, configuration files, the java archive files (JAR) that contain the logic and formatting instructions for the portal application; and any other files necessary for the desired portal application.

BRIEF DESCRIPTION OF THE FIGURES

FIGS. 2A-2C shows the operation of one embodiment of the present invention.

DETAILED DESCRIPTION

Portals are powerful Web sites can give users a single point of access to applications and information in a unified interface. A portal lets users view each application in its own window, called a portlet, and a single browser window can contain multiple portlets.

Portals can provide access to information networks and/or sets of services through the World Wide Web or other computer networks. These networks can range from broad interconnections of computing systems such as the Internet to localized area networks including a few computers located in close geographic proximity such as a home or office. Portal applications can include web application views designed as a portal.

Portlets can be implemented as java server pages (JSPs) referenced by XML-based metadata of the portal descriptor. Portlets can utilize various types of display code to display highly focused information directed to a specific user or user group, having a portal as its container. Portlets can be comprised of portlet components which include portlet attributes (i.e. whether the portlet is editable, floatable, minimizable, maximizable, helpable, mandatory, has defaults minimized, or whether login is required) and portlet layout elements or components (i.e. banner, header, content, and footer sections).

Figure 1:
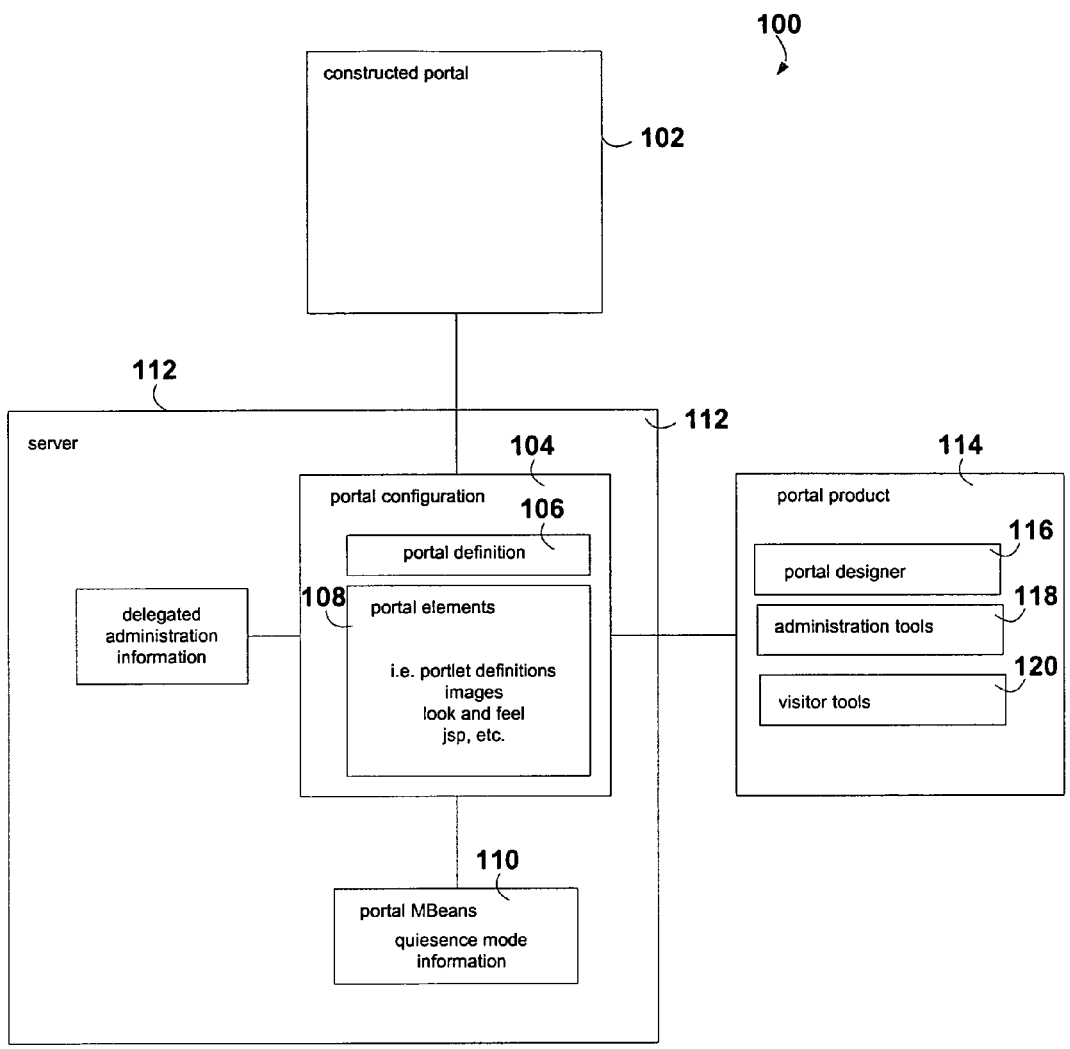
FIG. 1 is a diagram of a system of the present invention.

FIG. 1 is a diagram of a system 100 used to construct a portal 102. A portal configuration 104 is used to generate portal 102. The portal configuration can include a portal definition 106 and portal elements 108 identified by the portal definition 106. Based on quiescence mode information 110 changes to the portal configuration 104 can be enabled or disabled. If the quiescence mode information 110 indicates that a quiescence mode is set, changes to the portal configuration are disabled.

In one embodiment, the quiescence mode is helpful for periods when changes to the portal configuration 104 could interfere with another operation. For example, the quiescence mode is valuable during a configuration backup or during application propagation, such as when a live environment is updated with changes from a test environment.

In one embodiment, the quiescence mode includes multiple modes. The quiescence mode can include a read-only mode where the portal 102 can be produced from the portal configuration 104 but the portal configuration 104 cannot be changed. The quiescence mode can include a static mode in which the portal application is not accessible. Other modes can include a prepare mode that warns a user not to change the portal configuration. In an inactive mode, the portal configuration 104 can be changed in the normal manner.

In one embodiment, an object stores the quiescence mode information. The object can be an MBean, which insures that all servers of a cluster get the quiescence mode information from the object. The JAVA Management Extension (JMX) specification and the JMX Application Programming Interface (API) model system and administration functions with MBeans. MBeans used to manage an enterprise application can include administration, configuration, and runtime MBeans. Administration MBeans contain a set of attributes that define configuration parameters for management functions. In one embodiment, a configuration file, such as config.xml, is located at a machine hosting an administration server, which provides persistent storage of MBean attribute values. Whenever an attribute is changed using an administration console, administration tool or visitor tool, the values can be stored in the appropriate administration MBean and written to the config.xml file. Configuration MBeans are copies of the administration MBeans that the other servers use to initialize their configuration. Runtime MBeans are attributes consisting of runtime information for active application servers and instances in applications.

In one embodiment, APIs are used to access the object storing the quiescence mode information. A read API can be used to read the quiescence mode information from the object. A write API can be used to write the quiescence mode information to the object. The object can be checked before changing the portal configuration.

Delegated administration can be used to ensure compliance with the quiescence mode. Delegated Administration is a system that can restrict the access to data through an admin tool of a portal product to administrators and those designated by the administrators. Delegated administration information indicates what portal elements are accessible by what users. The delegated administration can be expanded to check for the quiescence mode information using quiescence mode APIs. Other systems such as locking or entitlements can also be expanded to implement the quiescence mode.

The administration tools 118 or visitor tools 120 for the portal can be used to set the quiescence mode information. The quiescence mode APIs can be accessed using a quiescence mode portlet.

A propagation tool can be used to automatically set the quiescence mode information. A propagation tool can be used for transferring changes made in a test environment to a live environment. The propagation tool can call the quiescence mode service to lock out changes to an environment while the update is taking place since large updates can take a significant amount of time.

In one embodiment, stored quiescence mode information 110 is used to determine whether to display a portal element of the portal for making changes to stored information. When the quiescence mode is set, the changes to the stored information are prevented for all users.

The portal element can be part of an administration tool and the stored information can be a portal configuration. In this case, the user is prevented from making changes to the portal since the administration tool page does not allow changes.

In one embodiment, the portal element is part of a user portal page. The quiescence mode can then be used as a service so that a portal can prevent changes to data other than the portal configuration, though the lack of display of a portal element.

FIG. 2A-2C illustrate one embodiment of a system of the present invention. The example of FIG. 2A, shows a test environment defined by a test portal configuration 202 which produces a test portal 204. The test portal configuration 202 uses configuration A produce to test portal 204 (version A). The administration tool 206 can be used for updating and modifying the test portal configuration 202. Typically, changes are made in the test environment to test before sending the changes to the online (live) system. In this example, the live portal 208 uses version B corresponding to the live portal configuration 210. The administration tool 212 can be used for changing the live portal configuration 210. Both the administration tools 206 and 212 display an "update configuration" portlet. This portlet can be used for modifying the portal configuration. The "update configuration" portlet can be displayed to a user based upon delegated administration. Delegated administration allows authorized users to be able to change configuration data. The checks of the quiescence mode can be done when the delegated administration checks are done.

FIG. 2B illustrates an example where a propagation tool is used to move configuration A into the live portal configuration. In this example, the propagation tool calls a quiescence mode service. The quiescence mode service can be used to prevent the display or the update of the stored information. For example, the quiescence mode server can, prevent the display of the "update configuration" portlet in the administration tools 220 and 222. If the quiescence mode is set, the "update configuration" portlet is not displayed to the user in the administration tool 220 and 222.

The quiescence mode can provide a means to prevent the display or update of stored information by more than one system at the same time. In one example, the display of the "update configuration" portlet is prevented so that we can update the configuration information via other means without having conflicts between the two sets of changes. In this case, we would use a propagation tool to move data from staging to production and know the update configuration portlet cannot interfere with this process, thus maintaining integrity of the configuration data.

FIG. 2C illustrates the system after the configuration update. The live portal 240 has the same version (version A) as the test portal 244 after the propagation tool has done its work. In this case, the test portal configuration 246 is the same as the live portal configuration 248. After the change has been made the quiescence mode can be set to inactive, and thus the "update configuration" portlet or other portal element for changing the stored data, such as the portal configuration, can be displayed in the administration tool displays 252 and 254.

Staging environments are used for large enterprises. Migration of portal data from staging to production is critical. In one embodiment, a propagation tool can be used. In step 1, a production environment is frozen with the quiescence service. In step 2, the staging environment and production environment are compared. In step 3, the propagation tool creates a propagation plan. In step 4, the propagation plan is followed to update the production environment. The propagation tool can move content selectors, property sets, users, groups, entitlements, desktops, pages books portlets and other info from the staging environment to the production environment.

Figure 3B:
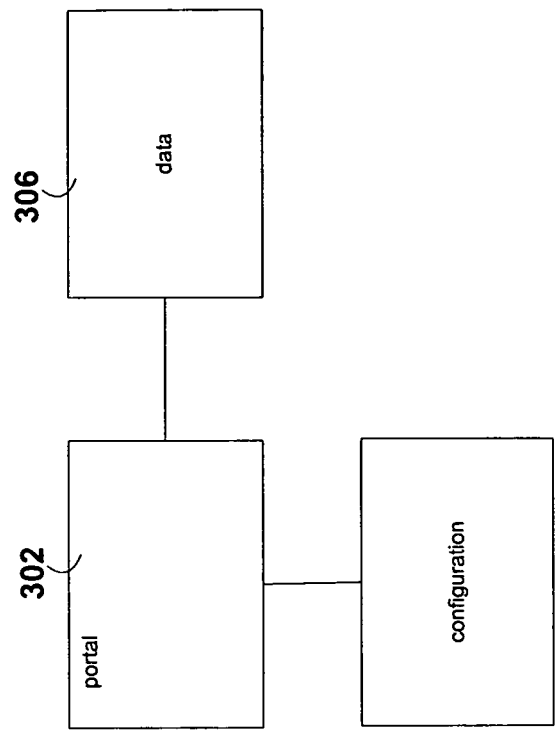
FIG. 3A-3B shows the operation of another embodiment of the present invention.
Figure 3A:
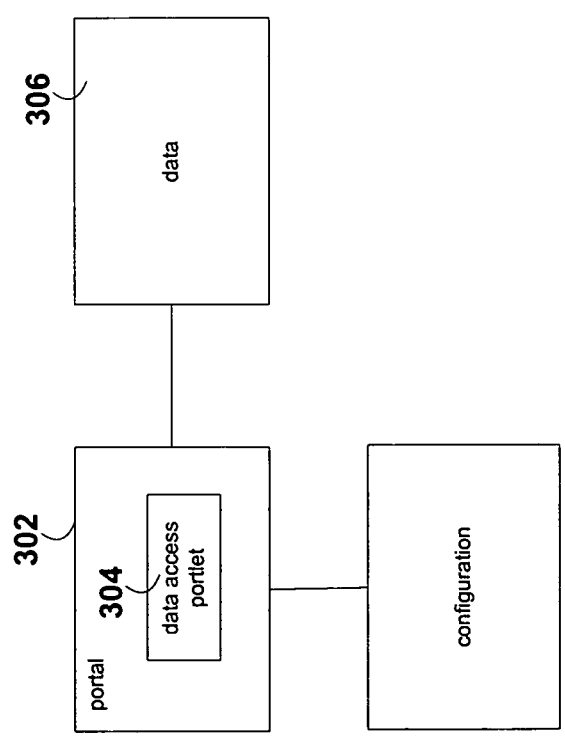

FIGS. 3A and 3B show an implementation where the quiescence mode is used to limit access to data other than configuration data. In FIG. 3A, with the quiescence mode not set, the portal 302 has a portal element (data access portlet 304) for accessing data 306. When the quiescence mode is set as shown in FIG. 3B, the portal element (data access portlet 304) is not displayed preventing changes to data 306.

The quiescence service is extensible for customer authored applications to block changes to their data. One example would be an order-entry system—there might be a time during upgrades when you want to block order entry into a database, but still allow the system to display previously entered orders. Application data such as customers orders can also suffer from problems if it is changed during migration from staging to production or during upgrades. The quiescence service can provide a locking mechanism for any type of data, be it configuration data or application data.

Looking again at FIG. 1, in one embodiment, the constructed portal 102 is implemented on a server 112. The server can implement the JAVA™ 2 Platform, Enterprise Edition (J2EE), available from Sun Microsystems, Inc. of Santa Clara, Calif. For example, the server can be a WebLogic Server™, available from BEA Systems, Inc. of San Jose, Calif.

Portal product 114 can be used to create and administer portals. A portal designer 116 can provide for the creation of the portal configuration. The portal configuration defines the portal and can be used to construct portal views. The portal product can be WebLogic Portal™, available from BEA Systems, Inc., of San Jose, Calif.

Administration tools 118 can be used for administering a portal. Portal administration involves tasks that control the behavior, content, and appearance of portals. While portal administrators do not develop the resources required for a portal Web site, they use those resources to maintain and modify portals. Administration tasks include setting up and managing users, creating and managing group portals, modifying portal attributes, creating personalization behavior, developing campaigns, and changing a portal's look and feel. The administration tools can use delegated administration to prevent unauthorized users from accessing certain portal resources.

Administration tools 118 can be used to create modified database-based portals. In one embodiment, a portal file is obtained by the administration tool, modifications can be made for a user or group of users and the modified portal description can be stored as portal XML in a database.

A client can access the portal across a network by using a portal Uniform Resource Locator (URL). The portal description and components are used to construct the portal 102 for the client.

Visitor tools 120 can allow users or sub-administrators to modify the portals similar to the administrative portal. The administrative tools 118 can be used to select what elements of the portal can be modified by the user or sub-administrator through the visitor tools 120. The user or sub-administrator can then set up the portal to their liking within the limits set by the administrator.

Details of a non-limiting example of a quiescence mode implementation are given below.

Exemplary Embodiment

In one embodiment, the Quiescence Mode (QM) feature is such that:
  It is application scoped.
  Changing the operating mode of the application is a privileged operation. The privilege can be delegated.
  The mode is a runtime characteristic; the mode can be changed at any time and the change will take immediate effect.
  Each feature of the product stack will be responsible for interpreting the mode levels and behave accordingly.
  Generically, an application in quiescence prevents any configuration changes to itself.
  Mode changes will be tracked, and this record will be available for viewing.
In one embodiment:
  Quiescence is not a simple toggle. There can be levels of quiescence:
    Inactive Mode—normal operating mode.
    Pre pare Mode—the application is being prepared for quiescence; users should be warned not to begin configuration activity. In-process configuration work should be hastened to conclusion.
    Read-only Mode—the application is in a state in which changes to the configuration of the application are not allowed.
    Static Mode—the application must not be accessed. All user traffic to the application is directed to a customizable page in the default webapp. May not be implemented for Devils Thumb.
  There are different user types that interact with a Portal application. Each use tools that may be impacted by QM:
    Administrator
    Delegated Administrator
    Community Leader
    End User
  In one embodiment, although a server restart or application redeploy is not necessary for a mode change, the quiescence mode can survive those operations. An application redeployed in Read-only Mode should remain in that mode after completion of the redeploy.
  In one embodiment, a mode change can have data associated with the change, including:
    A comment provided by the user that initiated the mode change.
    The user that initiated the mode change.
    Other audit trail information, like time of day, IP address of browser, etc.
  QM can be component dependent, meaning the QM service may be in different states for different components. A component might be:
    Portal Framework
    Content Management
    Portal Admin Tools
    Visitor Tools
    Campaigns
    There can be a user interface added to the Portal Admin Tool to support this feature.
    This feature can perform properly in a cluster. Meaning, mode changes will be propagated to all managed nodes in a timely manner.

Mode Configuration Implementation

This section discusses one embodiment of the mode will be toggled, persisted, and read. The Portal Admin Tools can use MBeans to track the quiescence mode. The mbean can track several pieces of data:
  The current QM mode name—e.g. "Inactive", "Prepare", "Readonly", etc.
  Available QM mode names—modes can be added by a developer.

The use of an Mbean will automatically provide support for
  Cluster notification—Mbeans are cluster aware
  Persistence—portal MBeans persist themselves into the appropriate descriptor.

Mode Access API

The API can be supported by a single interface for both read and write operations. The implementation of the service can be application scoped, which will eliminate the need for callers to pass the application name through the interface.

Read API

In one embodiment, the following methods approximate the read interface:
boolean isCurrentModeActive( )

Is the simple call to determine if the QM is inactive (false), or is in some stage of quiescence (true). Any mode other than "Inactive" is considered Active. Therefore, any custom modes added by a developer are considered Active.
String getCurrentModeName( )

Returns the name of the current mode.
List getAvailableModeNames( )

Returns a List of Strings referring to the available modes.

Write API

In one embodiment, the following methods approximate the write interface.
void setCurrentMode(String modeName, String reason) throws SomeKindOfSecurityException
  If the user has the privilege, changes the QM mode of the cluster immediately. Also records the reason in the audit trail.
void addMode(String modeName) throws SomeKindOfSecurityException
  If the user has the privilege, adds the mode to the QM mode list.
void removeMode(String modeName) throws SomeKindOfSecurityException
  If the user has the privilege, removes the mode from the QM mode list. Will not allow the removal of the default modes.
The core implementation of the interface can be facaded by a variety of access points:
  Plain Old Java Object (POJO) Singleton in the App Classloader—for easy access from any java code.

Stateless Session Bean (SLSB) with remote interface—to satisfy the remoting requirements.

Integrated Design Enviroment (IDE) Control—to be used from within an IDE, such as WebLogic Workshop™, available from BEA Systems, Inc. of San Jose, Calif.

Scripting—to allow mode changes from jPython JSP Tag library—read access from JSPs, covered in next section.

Tag Library

In one embodiment, the tag library is given by:
<qm:isCurrentModeActive>
<qm:isCurrentModeInactive>
<qm:getCurrentModeName>

Mode Enforcement Implementation

This section discusses how the mode state can be enforced by the various components.

Enforcement Requirements

A number of modes can be available to the administrator. Each mode can vary in both severity and scope. Severity is defined by the types of operations that are restricted (reads, updates, creates, deletes) and scope is defined by the components affected by the mode (CM, Portal Framework, Campaigns, etc).

A natural progression from the severity and scooping requirement is to define a set of capabilities and a set of resources. The capabilities map to the severity aspect, and the resources map to the scope aspect. Although QM could define such a structure, it begins to look like a problem that has already been solved by WLP.

A few technologies that perhaps could be reused to define and enforce QM modes.

Possible Enforcement Mechanisms

Potential Enforcement mechanisms for QM include:
1. Console Locking—a new mechanism to prevent multiple people from altering config.xml at the same time. Allows the admin to set the console into exclusive edit mode so that no other admin can makes modifications.
2. Entitlements—a mechanism already implemented in WLP that matches resources to roles. This mechanism allows administrators to selectively enable and disable page resources based on the role that the user is in.
3. Delegated Administration (DA)—a mechanism already implemented in WLP that allows administration capabilities to be assigned to users, and those capabilities can further be delegated to other users.

Using Delegated Administration for Enforcement

DA could be used in several ways to implement QM modes.

One implementation technique would be to do the following:
Add an implicit custom predicate to each DA policy.
The custom predicate would check the state of QM mode to make a decision.
The decision would enable/disable the feature.

There are several advantages to this approach:
Administration is already bound by DA policies. Therefore the admin tool and visitor tool would automatically respect QM.
This is a very granular approach. Modes can be defined by capabilities on resources.
Allows multiple modes to be defined; the custom predicate can choose how to evaluate the policy based on the specific mode it is in.

A portlet can be provided for the Portal Admin Tools to change the current quiescence mode. A command can be added to a Scripting environment to change the QM mode. The setting of the QM mode can be an authorized operation. This operation will be protected using DA at the API level.

Appendix I shows another non-limiting example implementation of the quiescence mode.

One embodiment may be implemented using a conventional general purpose or a specialized digital computer or microprocessor(s) programmed according to the teachings of the present disclosure, as will be apparent to those skilled in the computer art. Appropriate software coding can readily be prepared by skilled programmers based on the teachings of the present disclosure, as will be apparent to those skilled in the software art. The invention may also be implemented by the preparation of integrated circuits or by interconnecting an appropriate network of conventional component circuits, as will be readily apparent to those skilled in the art.

One embodiment includes a computer program product which is a storage medium (media) having instructions stored thereon/in which can be used to program a computer to perform any of the features presented herein. The storage medium can include, but is not limited to, any type of disk including floppy disks, optical discs, DVD, CD-ROMs, micro drive, and magneto-optical disks, ROMs, Rams, EPROM's, EPROM's, Drams, Rams, flash memory devices, magnetic or optical cards, Nan systems (including molecular memory ICs), or any type of media or device suitable for storing instructions and/or data.

Stored on any one of the computer readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, execution environments/containers, and user applications.

The foregoing description of preferred embodiments of the present invention has been provided for the purposes of illustration and description. It is not intended to be exhaustive or to limit the invention to the precise forms disclosed. Many modifications and variations will be apparent to one of ordinary skill in the relevant arts. For example, steps performed in the embodiments of the invention disclosed can be performed in alternate orders, certain steps can be omitted, and additional steps can be added. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the claims and their equivalents.

What is claimed is:

1. A method for operating a portal, comprising:
generating a portal using a portal configuration, the portal configuration including a portal definition and portal elements identified by the portal definition;
enabling or disabling changes to the portal configuration based on a quiescence mode that includes a read-only mode, a static mode and a prepare mode; and wherein
in the read-only mode of the quiescence mode, the portal is produced from the portal configuration, but the portal configuration can not be changed;
in the static mode of the quiescence mode, the portal is not accessible; and
in the prepare mode of the quiescence mode, the user is warned not to change the portal configuration; and wherein at least one of the (1) generating step and (2) enabling or disabling step is executed using at least one processor.

2. The method of claim 1, when the portal is in an inactive mode, the portal configuration can be changed.

3. The method of claim 1, further comprising storing the quiescence mode information in an object.

4. The method of claim 3, further comprising using the object to interact with a cluster so servers of the cluster can get the quiescence mode information from the object.

5. The method of claim 3, further comprising using APIs to access the object.

6. The method of claim 3, wherein the object is an MBean; and wherein the storing step is such that the quiescence mode information is stored in the MBean.

7. The method of claim 1, further comprising setting the quiescence mode information with a propagation tool.

8. A method for operating a portal, comprising:

generating a portal; and determining whether to display a portal element of the portal using a quiescence mode that includes a read-only mode, a static mode and a prepare mode; and wherein in the read-only mode of the quiescence mode, the portal can be produced from portal configuration, but the portal configuration can not be changed;

in the static mode of the quiescence mode, the portal is not accessible; and in the prepare mode of the quiescence mode, a user is warned not to change the portal configuration; and wherein at least one of the (1) generating step and (2) determining step is executed using at least one processor.

9. The method of claim 8, wherein the portal element is part of an administration tool and the stored quiescence mode information is used to determine whether to display the part of the administration tool.

10. The method of claim 8, wherein the portal element is part of a user portal page; and wherein the stored quiescence mode information is used to determine whether to display the part of the user portal page.

11. The method of claim 8, further comprising using rules to set access to portal elements through delegated administration.

12. The method of claim 11, further comprising using the delegated administration to check the quiescence mode information and determine whether to display the portal element.

13. The method of claim 8, further comprising using an object to store the quiescence mode information.

14. The method of claim 13, further comprising using the object to interact with a cluster so servers of the cluster can get the quiescence mode information from the object.

15. The method of claim 13, further comprising using APIs to access the object.

16. The method of claim 13, wherein the object is an MBean; and wherein the storing step is such that the quiescence mode information is stored in the MBean.

17. A computer storage medium having store thereon computer executable instructions for performing the steps comprising:

generating a portal using a portal configuration, the portal configuration including a portal definition and portal elements identified by the portal definition; and enabling and disabling changes to the portal configuration based on a quiescence mode that includes a read-only mode, a static mode and a prepare mode;

wherein in the read-only mode of the quiescence mode, the portal is produced from the portal configuration, but the portal configuration can not be changed;

wherein in the static mode of the quiescence mode, the portal is not accessible; and wherein in the prepare mode of the quiescence mode, the user is warned not to change the portal configuration.

* * * * *

UNITED STATES PATENT AND TRADEMARK OFFICE
CERTIFICATE OF CORRECTION

PATENT NO. : 7,607,139 B2  Page 1 of 1
APPLICATION NO. : 11/108384
DATED : October 20, 2009
INVENTOR(S) : Peter Laird et al.

It is certified that error appears in the above-identified patent and that said Letters Patent is hereby corrected as shown below:

On sheet 1 of 3, in Figure 1, Box No. 110, line 2, delete "quiesence" and insert -- quiescence --, therefor.

In column 5, line 37, delete "Pre pare" and insert -- Prepare --, therefor.

In column 7, line 3, delete "Enviroment" and insert -- Environment --, therefor.

Signed and Sealed this

Tenth Day of August, 2010

David J. Kappos
*Director of the United States Patent and Trademark Office*

UNITED STATES PATENT AND TRADEMARK OFFICE
CERTIFICATE OF CORRECTION

PATENT NO. : 7,607,139 B2
APPLICATION NO. : 11/108384
DATED : October 20, 2009
INVENTOR(S) : Laird et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1220 days.

Signed and Sealed this

Twelfth Day of October, 2010

David J. Kappos
*Director of the United States Patent and Trademark Office*